(12) United States Patent
Chebiyyam et al.

(10) Patent No.: US 8,590,002 B1
(45) Date of Patent: Nov. 19, 2013

(54) SYSTEM, METHOD AND COMPUTER PROGRAM PRODUCT FOR MAINTAINING A CONFIDENTIALITY OF DATA ON A NETWORK

(75) Inventors: Gopi Krishna Chebiyyam, Hyderabad (IN); Prasanna Ganapathi Basavapatna, Bangalore (IN)

(73) Assignee: McAfee Inc., Santa Clara, CA (US)

( * ) Notice: Subject to any disclaimer, the term of this patent is extended or adjusted under 35 U.S.C. 154(b) by 1391 days.

(21) Appl. No.: 11/564,745

(22) Filed: Nov. 29, 2006

(51) Int. Cl.
*G06F 21/00* (2013.01)

(52) U.S. Cl.
USPC ...... 726/1; 726/4; 726/24; 713/167; 713/189; 380/200; 709/206; 709/213

(58) Field of Classification Search
USPC ..................................... 726/1, 22
See application file for complete search history.

(56) References Cited

U.S. PATENT DOCUMENTS

| | | | |
|---|---|---|---|
| 5,280,527 A | | 1/1994 | Gullman et al. |
| 5,572,694 A | | 11/1996 | Uchino |
| 5,796,948 A | | 8/1998 | Cohen |
| 5,845,068 A | * | 12/1998 | Winiger .............. 726/3 |
| 5,941,915 A | | 8/1999 | Federle et al. |
| 5,987,610 A | | 11/1999 | Franczek et al. |
| 6,073,142 A | | 6/2000 | Geiger et al. |
| 6,367,019 B1 | | 4/2002 | Ansell et al. |
| 6,460,050 B1 | | 10/2002 | Pace et al. |
| 6,658,566 B1 | | 12/2003 | Hazard |
| 6,718,367 B1 | * | 4/2004 | Ayyadurai .............. 709/206 |
| 6,741,851 B1 | | 5/2004 | Lee et al. |
| 6,820,204 B1 | | 11/2004 | Desai et al. |
| 6,934,857 B1 | | 8/2005 | Bartleson et al. |
| 6,957,330 B1 | | 10/2005 | Hughes |
| 6,961,765 B2 | | 11/2005 | Terry |
| 7,023,816 B2 | | 4/2006 | Couillard |
| 7,100,123 B1 | | 8/2006 | Todd et al. |
| 7,124,197 B2 | | 10/2006 | Ocepek et al. |
| 7,149,778 B1 | * | 12/2006 | Patel et al. .............. 709/206 |
| 7,194,623 B1 | | 3/2007 | Proudler et al. |
| 7,194,728 B1 | | 3/2007 | Sirota et al. |
| 7,257,707 B2 | | 8/2007 | England et al. |
| 7,278,016 B1 | | 10/2007 | Detrick et al. |
| 7,313,615 B2 | | 12/2007 | Fitzpatrick et al. |
| 7,346,778 B1 | | 3/2008 | Guiter et al. |
| 7,350,074 B2 | | 3/2008 | Gupta et al. |
| 7,350,084 B2 | | 3/2008 | Abiko et al. |
| 7,437,752 B2 | | 10/2008 | Heard et al. |

(Continued)

FOREIGN PATENT DOCUMENTS

| | | | |
|---|---|---|---|
| GB | 2411330 | | 8/2005 |
| WO | WO 02093410 A1 | * | 11/2002 |
| WO | WO 2006/076536 | | 7/2006 |
| WO | WO 2006/076536 A2 | | 7/2006 |

OTHER PUBLICATIONS

Final Office Action in U.S. Appl. No. 11/473,930 mailed on Sep. 14, 2011.

(Continued)

*Primary Examiner* — Morshed Mehedi
(74) *Attorney, Agent, or Firm* — Patent Capital Group

(57) ABSTRACT

A data processing system, method and computer program product are provided. In use, data on a network is identified. In addition, a policy is identified. Further, the data is processed based on the policy for maintaining a confidentiality of the data.

24 Claims, 5 Drawing Sheets

(56) References Cited

U.S. PATENT DOCUMENTS

| | | | |
|---|---|---|---|
| 7,461,249 B1 | 12/2008 | Pearson et al. | |
| 7,475,420 B1 | 1/2009 | Hernacki | |
| 7,484,247 B2 | 1/2009 | Rozman et al. | |
| 7,490,355 B2 | 2/2009 | Wong | |
| 7,506,155 B1 | 3/2009 | Stewart et al. | |
| 7,519,984 B2* | 4/2009 | Bhogal et al. | 726/2 |
| 7,523,484 B2 | 4/2009 | Lum et al. | |
| 7,526,654 B2 | 4/2009 | Charbonneau | |
| 7,539,857 B2 | 5/2009 | Bartlett et al. | |
| 7,559,080 B2* | 7/2009 | Bhargavan et al. | 726/1 |
| 7,581,004 B2 | 8/2009 | Jakobson | |
| 7,630,986 B1 | 12/2009 | Herz et al. | |
| 7,653,811 B2 | 1/2010 | Yagiura | |
| 7,661,124 B2 | 2/2010 | Ramanathan et al. | |
| 7,689,563 B1* | 3/2010 | Jacobson | 707/663 |
| 7,730,040 B2 | 6/2010 | Reasor et al. | |
| 7,742,406 B1* | 6/2010 | Muppala | 370/230 |
| 7,847,694 B2* | 12/2010 | Lee et al. | 340/572.1 |
| 7,877,616 B2 | 1/2011 | Abiko et al. | |
| 7,890,587 B1 | 2/2011 | Chebiyyam | |
| 7,940,756 B1* | 5/2011 | Duffy et al. | 370/389 |
| 8,103,727 B2 | 1/2012 | Lin | |
| 8,111,413 B2 | 2/2012 | Nuggehalli et al. | |
| 8,151,363 B2 | 4/2012 | Smithson | |
| 8,181,036 B1 | 5/2012 | Nachenberg | |
| 8,199,965 B1 | 6/2012 | Basavapatna et al. | |
| 8,272,058 B2 | 9/2012 | Brennan | |
| 8,353,053 B1 | 1/2013 | Chebiyyam | |
| 8,446,607 B2 | 5/2013 | Zucker et al. | |
| 2001/0046069 A1* | 11/2001 | Jones | 358/402 |
| 2002/0046275 A1 | 4/2002 | Crosbie et al. | |
| 2002/0083003 A1 | 6/2002 | Halliday et al. | |
| 2002/0099944 A1 | 7/2002 | Bowlin | |
| 2002/0157089 A1 | 10/2002 | Patel et al. | |
| 2003/0046679 A1 | 3/2003 | Singleton | |
| 2003/0065937 A1 | 4/2003 | Watanabe et al. | 713/200 |
| 2003/0097583 A1* | 5/2003 | Lacan et al. | 713/200 |
| 2003/0105979 A1* | 6/2003 | Itoh et al. | 713/201 |
| 2003/0133443 A1* | 7/2003 | Klinker et al. | 370/353 |
| 2003/0135744 A1 | 7/2003 | Almedia | |
| 2003/0177394 A1 | 9/2003 | Dozortsev | |
| 2003/0182435 A1 | 9/2003 | Redlich et al. | |
| 2003/0192033 A1 | 10/2003 | Gartside et al. | |
| 2003/0233421 A1 | 12/2003 | Shibata et al. | |
| 2004/0003255 A1 | 1/2004 | Apvrille et al. | |
| 2004/0006715 A1 | 1/2004 | Skrepetos | |
| 2004/0010686 A1 | 1/2004 | Goh et al. | |
| 2004/0027601 A1 | 2/2004 | Ito et al. | |
| 2004/0034794 A1 | 2/2004 | Mayer et al. | |
| 2004/0054928 A1 | 3/2004 | Hall | |
| 2004/0064732 A1 | 4/2004 | Hall | |
| 2004/0088433 A1 | 5/2004 | Kaler et al. | |
| 2004/0111482 A1* | 6/2004 | Bourges-Waldegg et al. | 709/207 |
| 2004/0117802 A1 | 6/2004 | Green | |
| 2004/0146006 A1* | 7/2004 | Jackson | 370/230 |
| 2004/0172557 A1 | 9/2004 | Nakae et al. | |
| 2004/0199555 A1* | 10/2004 | Krachman | 707/204 |
| 2004/0199566 A1 | 10/2004 | Carlson et al. | |
| 2004/0199596 A1* | 10/2004 | Nutkis | 709/207 |
| 2004/0230572 A1 | 11/2004 | Omigui | |
| 2004/0255138 A1 | 12/2004 | Nakae | |
| 2005/0033810 A1 | 2/2005 | Malcolm | |
| 2005/0038853 A1 | 2/2005 | Blanc et al. | |
| 2005/0044359 A1 | 2/2005 | Eriksson et al. | |
| 2005/0060643 A1 | 3/2005 | Glass et al. | |
| 2005/0131990 A1 | 6/2005 | Jewell | |
| 2005/0132184 A1 | 6/2005 | Palliyil et al. | |
| 2005/0166066 A1* | 7/2005 | Ahuja et al. | 713/189 |
| 2005/0172140 A1 | 8/2005 | Ide | |
| 2005/0198285 A1 | 9/2005 | Petit | |
| 2005/0204009 A1 | 9/2005 | Hazarika et al. | |
| 2005/0216749 A1 | 9/2005 | Brent | |
| 2005/0262208 A1 | 11/2005 | Haviv et al. | |
| 2005/0275861 A1 | 12/2005 | Ferlitsch | |
| 2005/0289181 A1 | 12/2005 | Deninger et al. | |
| 2006/0005244 A1 | 1/2006 | Garbow et al. | |
| 2006/0010209 A1 | 1/2006 | Hodgson | |
| 2006/0010217 A1 | 1/2006 | Sood | |
| 2006/0021043 A1 | 1/2006 | Kaneko et al. | |
| 2006/0026593 A1 | 2/2006 | Canning et al. | |
| 2006/0041930 A1 | 2/2006 | Hafeman et al. | |
| 2006/0050879 A1 | 3/2006 | Iizuka | |
| 2006/0059548 A1* | 3/2006 | Hildre et al. | 726/9 |
| 2006/0070089 A1 | 3/2006 | Shoaib et al. | |
| 2006/0075040 A1 | 4/2006 | Chimaytelli | |
| 2006/0075502 A1 | 4/2006 | Edwards | |
| 2006/0112166 A1* | 5/2006 | Pettigrew et al. | 709/206 |
| 2006/0120526 A1* | 6/2006 | Boucher et al. | 380/247 |
| 2006/0123413 A1 | 6/2006 | Collet et al. | |
| 2006/0123479 A1* | 6/2006 | Kumar et al. | 726/23 |
| 2006/0132824 A1 | 6/2006 | Aritomi | |
| 2006/0168026 A1 | 7/2006 | Keohane et al. | |
| 2006/0190986 A1 | 8/2006 | Mont et al. | |
| 2006/0224589 A1* | 10/2006 | Rowney et al. | 707/9 |
| 2006/0248252 A1 | 11/2006 | Kharwa | |
| 2007/0022285 A1 | 1/2007 | Groth et al. | |
| 2007/0028112 A1 | 2/2007 | Mackelden et al. | |
| 2007/0033283 A1* | 2/2007 | Brown | 709/226 |
| 2007/0064883 A1* | 3/2007 | Rosenthal et al. | 379/67.1 |
| 2007/0074292 A1 | 3/2007 | Mimatsu | |
| 2007/0094394 A1* | 4/2007 | Singh et al. | 709/226 |
| 2007/0101419 A1 | 5/2007 | Dawson | |
| 2007/0110089 A1 | 5/2007 | Essafi et al. | |
| 2007/0118904 A1 | 5/2007 | Goodman et al. | |
| 2007/0136593 A1 | 6/2007 | Plavcan et al. | |
| 2007/0143472 A1 | 6/2007 | Clark et al. | |
| 2007/0143851 A1* | 6/2007 | Nicodemus et al. | 726/25 |
| 2007/0174909 A1 | 7/2007 | Burchett et al. | |
| 2007/0198656 A1 | 8/2007 | Mazzaferri et al. | |
| 2007/0214220 A1* | 9/2007 | Alsop et al. | 709/206 |
| 2007/0220319 A1 | 9/2007 | Desai et al. | |
| 2007/0245148 A1 | 10/2007 | Buer | |
| 2007/0279668 A1 | 12/2007 | Czyszczewski et al. | |
| 2007/0280112 A1* | 12/2007 | Zheng et al. | 370/235 |
| 2008/0034224 A1 | 2/2008 | Ferren et al. | |
| 2008/0040358 A1 | 2/2008 | Deng | |
| 2008/0065882 A1 | 3/2008 | Goodman et al. | |
| 2008/0065903 A1 | 3/2008 | Goodman et al. | |
| 2008/0079730 A1 | 4/2008 | Zhang et al. | |
| 2008/0083037 A1 | 4/2008 | Kruse et al. | |
| 2008/0120689 A1* | 5/2008 | Morris et al. | 726/1 |
| 2008/0170785 A1 | 7/2008 | Simmons et al. | |
| 2008/0208988 A1 | 8/2008 | Khouri et al. | |
| 2008/0229428 A1 | 9/2008 | Camiel | |
| 2008/0279381 A1 | 11/2008 | Narendra et al. | |
| 2008/0309967 A1 | 12/2008 | Ferlitsch et al. | |
| 2009/0055536 A1 | 2/2009 | Jo | |
| 2009/0086252 A1 | 4/2009 | Zucker et al. | |
| 2009/0172786 A1 | 7/2009 | Backa | |
| 2009/0182931 A1 | 7/2009 | Gill et al. | |
| 2009/0232300 A1 | 9/2009 | Zucker et al. | |
| 2009/0327743 A1 | 12/2009 | Finlayson et al. | |
| 2010/0174784 A1 | 7/2010 | Levey et al. | |
| 2011/0167265 A1 | 7/2011 | Ahuja et al. | |
| 2012/0011189 A1 | 1/2012 | Werner et al. | |
| 2012/0183174 A1 | 7/2012 | Basavapatna et al. | |
| 2012/0191792 A1 | 7/2012 | Chebiyyam | |

OTHER PUBLICATIONS

Notice of Allowance in U.S. Appl. No. 12/187,207 mailed on Aug. 24, 2011.

Request for Continued Examination and Amendment in U.S. Appl. No. 11/473,930, filed Nov. 14, 2011.

Response to Non-Final Office Action dated Jul. 20, 2011 in U.S. Appl. No. 11/740,844, filed Oct. 19, 2011.

Response to Non-Final Action dated Jul. 21, 2011 in U.S. Appl. No. 11/840,831, filed Oct. 19, 2011.

Final Office Action in U.S. Appl. No. 11/905,420 mailed on Nov. 2, 2011.

Final Office Action in U.S. Appl. No. 12/076,163 mailed on Oct. 19, 2011.

(56) References Cited

OTHER PUBLICATIONS

Request for Continued Examination in U.S. Appl. No. 12/187,207, filed Nov. 11, 2011.
Request for Continued Examination and Amendment in U.S. Appl. No. 11/840,831, filed Jul. 5, 2011.
Response to Non-Final Action dated Mar. 25, 2011 in U.S. Appl. No. 12/187,207, filed Jun. 27, 2011.
Response to Non-Final Action dated May 23, 2011 in U.S. Appl. No. 11/905,420, filed Aug. 22, 2011.
ClearContext, www.clearcontext.com/user_guide/; [available online at at URL <http://web.archive.org/20061107135010/http://www.clearcontext.com/user_guide/>], Nov. 7, 206 (pp. 1-24).
Dabbish, et al., "Understanding Email Use: Predicting Action on a Message," CHI 2005—Papers: Email and Security, Portland Oregon; available online at URL: <http://www.cs.cmu.edu/kraut/Rkraut.site.files/articles/dabbish05-UnderstandingEmailUse.pdf> Apr. 2-7, 2005 (pp. 691-700).
Non-Final Office Action in U.S. Appl. No. 11/740,844 mailed on Jul. 20, 2011.
Non-Final Office Action in U.S. Appl. No. 11/840,831 mailed on Jul. 21, 2011.
Response to Non-Final Office Action dated Apr. 28, 2011 in U.S. Appl. No. 12/076,163, filed Jul. 28, 2011.
Fumera, G. et al., "Spam Filtering Based on the Analysis of Text Information Embedded into Images," Journal of Machine Learning Research, Dec. 2006.
U.S. Appl. No. 11/349,479, filed Feb. 6, 2006.
Non-Final Rejection in U.S. Appl. No. 11/349,479 mailed on Dec. 8, 2008.
Response to Non-Final Action dated Dec. 8, 2008 in U.S. Appl. No. 11/349,479 filed Mar. 9, 2009.
Final Rejection in U.S. Appl. No. 11/349,479 mailed on Jun. 10, 2009.
Notice of Appeal in U.S. Appl. No. 11/349,479, filed Dec. 10, 2009.
Appeal Brief filed in U.S. Appl. No. 11/349,479, filed Dec. 10, 2009.
Examiner Interview Summary in U.S. Appl. No. 11/349,479 mailed on Feb. 5, 2010.
Non-Final Rejection in U.S. Appl. No. 11/349,479 mailed on Mar. 22, 2010.
Response to Non-Final Action dated Mar. 22, 2010 in U.S. Appl. No. 11/349,479 filed Jul. 22, 2010.
Notice of Allowance in U.S. Appl. No. 11/349,479 mailed on Nov. 8, 2010.
U.S. Appl. No. 11/473,930, filed Jun. 23, 2006.
Non-Final Office Action in U.S. Appl. No. 11/473,930 mailed on Aug. 17, 2009.
Response to Non-Final Office Action dated Aug. 17, 2009 in U.S. Appl. No. 11/473,930, filed Nov. 17, 2009.
Non-Final Office Action in U.S. Appl. No. 11/473,930 mailed on Jan. 26, 2010.
Response to Non-Final Office Action dated Jan. 26, 2010 in U.S. Appl. No. 11/473,930, filed Apr. 26, 2010.
Non-Final Office Action in U.S. Appl. No. 11/473,930 mailed on Jul. 16, 2010.
Response to Non-Final Office Action dated Jul. 16, 2010 in U.S. Appl. No. 11/473,930, filed Dec. 16, 2010.
Non-Final Office Action in U.S. Appl. No. 11/473,930 mailed on Mar. 10, 2011.
Response to Non-Final Action dated Mar. 10, 2011 in U.S. Appl. No. 11/473,930, filed Jun. 10, 2011.
U.S. Appl. No. 11/740,844, filed Apr. 26, 2007.
Non-Final Office Action in U.S. Appl. No. 11/740,844 mailed on May 14, 2009.
Response to Non-Final Office Action dated May 14, 2009 in U.S. Appl. No. 11/740,844, filed Oct. 14, 2009.
Final Office Action in U.S. Appl. No. 11/740,844 mailed on Jan. 11, 2010.
Response to Final Office Action dated Jan. 11, 2010 in U.S. Appl. No. 11/740,844, filed Mar. 11, 2010.
Advisory Action in U.S. Appl. No. 11/740,844 mailed on Mar. 25, 2010.
Request for Continued Examination and Amendment filed in U.S. Appl. No. 11/740,844, filed Mar. 29, 2010.
Non-Final Office Action in U.S. Appl. No. 11/740,844 mailed on Jun. 24, 2010.
Response to Non-Final Office Action dated Jun. 24, 2010 in U.S. Appl. No. 11/740,844, filed Nov. 24, 2010.
Final Office Action in U.S. Appl. No. 11/740,844 mailed on Feb. 18, 2011.
Response to Final Office Action dated Feb. 18, 2011 in U.S. Appl. No. 11/740,844, filed Apr. 18, 2011.
Advisory Action in U.S. Appl. No. 11/740,844 mailed on Apr. 27, 2011.
Request for Continued Examination and Amendment filed in U.S. Appl. No. 11/740,844, filed May 18, 2011.
U.S. Appl. No. 11/840,831, filed Aug. 17, 2007.
Non-Final Office Action in U.S. Appl. No. 11/840,831 mailed on Oct. 12, 2010.
Response to Non-Final Action dated Oct. 12, 2010 in U.S. Appl. No. 11/840,831, filed Feb. 14, 2011.
Final Office Action in U.S. Appl. No. 11/840,831 mailed on May 5, 2011.
Non-Final Office Action in U.S. Appl. No. 11/905,420 mailed on May 23, 2011.
Non-Final Office Action in U.S. Appl. No. 12/076,163 mailed on Apr. 28, 2011.
Non-Final Office Action in U.S. Appl. No. 12/187,207 mailed on Mar. 25, 2011.
U.S. Appl. No. 11/850,432, filed Sep. 5, 2007.
U.S. Appl. No. 12/123,370, filed May 19, 2008.
U.S. Appl. No. 12/102,526, filed Apr. 14, 2008.
U.S. Appl. No. 11/210,321, filed Aug. 23, 2005.
Non-Final Office Action in U.S. Appl. No. 11/473,930 mailed on Mar. 1, 2012.
Final Office Action in U.S. Appl. No. 11/740,844 mailed on Feb. 16, 2012.
Request for Continued Examination and Amendment in U.S. Appl. No. 11/740,844, filed Apr. 16, 2012.
Final Office Action in U.S. Appl. No. 11/840,831 mailed on Dec. 21, 2011.
Request for Continued Examination and Response in U.S. Appl. No. 11/840,831, filed Feb. 21, 2012.
Notice of Allowance in U.S. Appl. No. 11/840,831 mailed on Mar. 16, 2012.
Request for Continued Examination in U.S. Appl. No. 11/840,831, filed Mar. 22, 2012.
Notice of Allowance in U.S. Appl. No. 11/840,831 mailed on Apr. 3, 2012.
U.S. Appl. No. 13/429,363 entitled "System, Method, and Computer Program Product for Preventing Image-Related Data Loss", filed Mar. 24, 2012.
Request for Continued Examination and Amendment in U.S. Appl. No. 11/905,420, filed Jan. 3, 2012.
Request for Continued Examination and Amendment in U.S. Appl. No. 12/076,163, filed Jan. 19, 2012.
U.S. Appl. No. 13/434,777, filed Mar. 29, 2012, entitled "System, Method, and Computer Program Product for Determining Whether an Electronic Mail Message is Compliant with an Etiquette Policy", Inventor Gopi Krishna Chebiyyam.
Layland, Robin, "Data Leak Prevention: Coming Soon to a Business Near You," Business Communications Review, May 2007 (pp. 44-49).
Heikkila, Faith M., "Encryption: Security Considerations for Portable Media Devices," IEEE Computer Society, IEEE Security & Privacy, Jul./Aug. 2007 (pp. 22-27).
Response to Non-Final Office Action dated Mar. 1, 2012 in U.S. Appl. No. 11/473,930, filed May 29, 2012.
Final Office Action in U.S. Appl. No. 11/473,930 mailed on Aug. 8, 2012.
Final Office Action in U.S. Appl. No. 11/740,844 mailed on Aug. 15, 2012.

(56) References Cited

OTHER PUBLICATIONS

Response to Non-Final Office Action dated Jul. 23, 2012 in U.S. Appl. No. 11/905,420, filed Oct. 23, 2012.
Non-Final Office Action in U.S. Appl. No. 12/076,163 mailed on Sep. 4, 2012.
Notice of Allowance in U.S. Appl. No. 12/187,207 mailed on Sep. 11, 2012.
Non-Final Office Action in U.S. Appl. No. 13/434,777 mailed on Aug. 20, 2012.
Request for Continued Examination and Amendment to in U.S. Appl. No. 11/473,930, filed Nov. 7, 2012.
Non-Final Office Action in U.S. Appl. No. 11/473,930 mailed on Feb. 4, 2013.
Request for Continued Examination and Amendment in U.S. Appl. No. 11/740,844, filed Nov. 15, 2012.
Non-Final Office Action in U.S. Appl. No. 11/740,844 mailed on May 3, 2013.
Notice of Allowance in U.S. Appl. No. 11/905,420 mailed on Dec. 6, 2012.
Response to Non-Final Office Action dated Sep. 4, 2012 in U.S. Appl. No. 12/076,163, filed Dec. 4, 2012.
Final Office Action in U.S. Appl. No. 12/076,163 mailed on Mar. 25, 2013.
Request for Continued Examination in U.S. Appl. No. 12/187,207, filed Dec. 11, 2012.
Response to Non-Final Office Action dated Aug. 20, 2012 in U.S. Appl. No. 13/434,777, filed Nov. 20, 2012.
Final Office Action in U.S. Appl. No. 13/434,777 mailed on Feb. 12, 2013.
Request for Continued Examination in U.S. Appl. No. 13/434,777, filed Apr. 15, 2013.
Non-Final Office Action in U.S. Appl. No. 13/434,777 mailed on May 23, 2013.
Non-Final Office Action in U.S. Appl. No. 12/102,526 mailed on Nov. 24, 2010.
Response to Non-Final Office Action dated Nov. 24, 2010 in U.S. Appl. No. 12/102,526, filed Mar. 9, 2011.
Final Office Action in U.S. Appl. No. 12/102,526 mailed on May 25, 2011.
After Final Response to Final Office Action dated May 25, 2011 in U.S. Appl. No. 12/105,526, filed Jul. 13, 2011.
Advisory Action in U.S. Appl. No. 12/105,526 mailed on Aug. 1, 2011.
Request for Continued Examination in U.S. Appl. No. 12/105,526, filed Aug. 25, 2011.
Notice of Allowance in U.S. Appl. No. 12/105,526 mailed on Sep. 21, 2013.
Non-Final Office Action in U.S. Appl. No. 11/740,844 mailed on May 10, 2012.
Response to Non-Final Office Action dated May 10, 2012 in U.S. Appl. No. 11/740,844, filed Jul. 10, 2012.
Request for Continued Examination in U.S. Appl. No. 11/840,831, filed Apr. 27, 2012.
Notice of Allowance in U.S. Appl. No. 11/840,831 mailed on May 9, 2012.
Non-Final Office Action in U.S. Appl. No. 11/905,420 mailed on Jul. 23, 2011.

* cited by examiner

# partial content; producing as requested

SYSTEM, METHOD AND COMPUTER PROGRAM PRODUCT FOR MAINTAINING A CONFIDENTIALITY OF DATA ON A NETWORK

FIELD OF THE INVENTION

The present invention relates to confidential data, and more particularly to maintaining the confidentiality of data.

BACKGROUND

Due to the widespread use of networked computers, data transfer has become easily accessible. For example, electronic mail (e-mail), instant messaging, etc. is widely utilized for transmitting data from one location on a network to another. Often, maintaining a confidentiality of data is desired, for example, within a particular subset of computers (e.g. an organization such as a corporation, etc.). However, it has traditionally been difficult to control the transmission of data based on the confidentiality thereof.

There is thus a need for overcoming these and/or other issues associated with the prior art.

SUMMARY

A data processing system, method and computer program product are provided. In use, data on a network is identified. In addition, a policy is identified. Further, the data is processed based on the policy for maintaining a confidentiality of the data.

DETAILED DESCRIPTION

Figure 1:
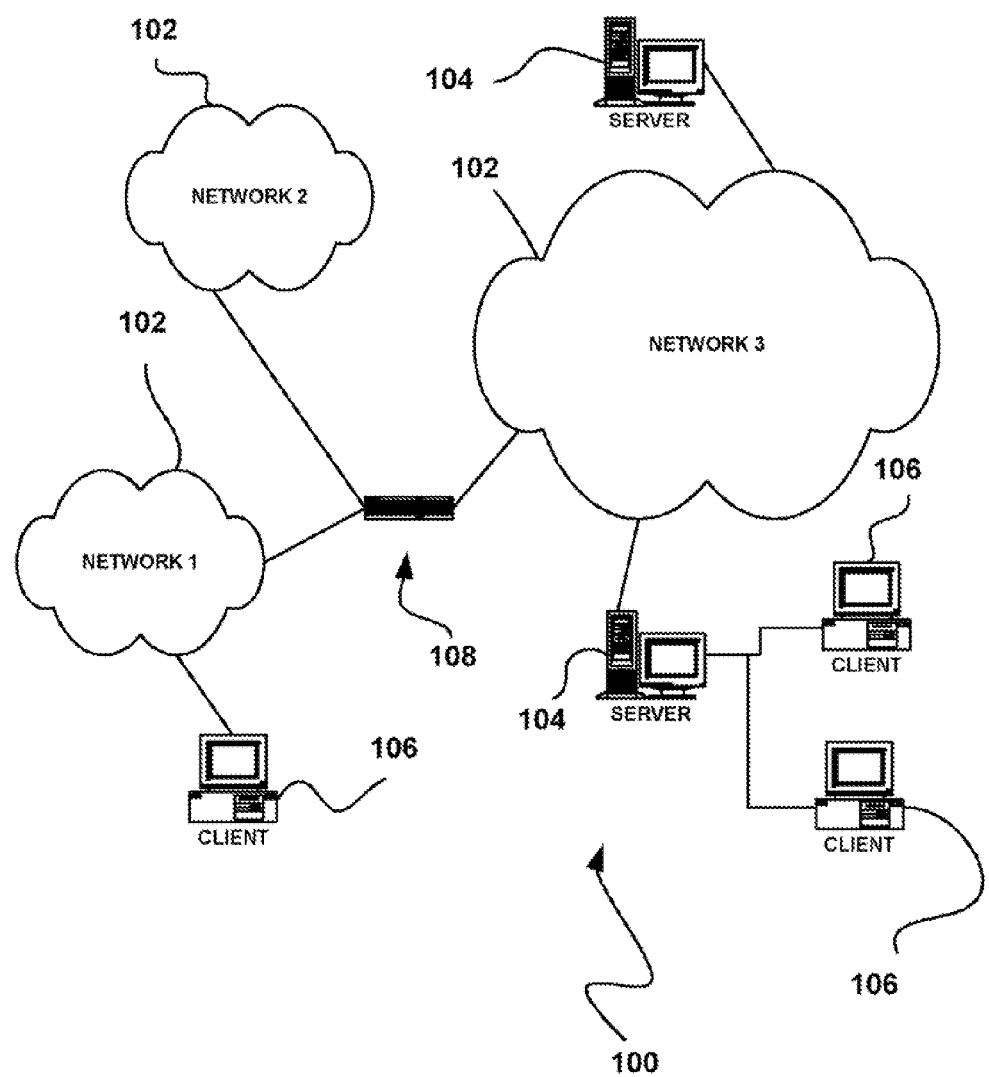
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer/device, and/or any other type of logic, for that mater. In order to facilitate communication among the networks 102, at least one gateway 108 is optionally coupled therebetween.

Figure 2:
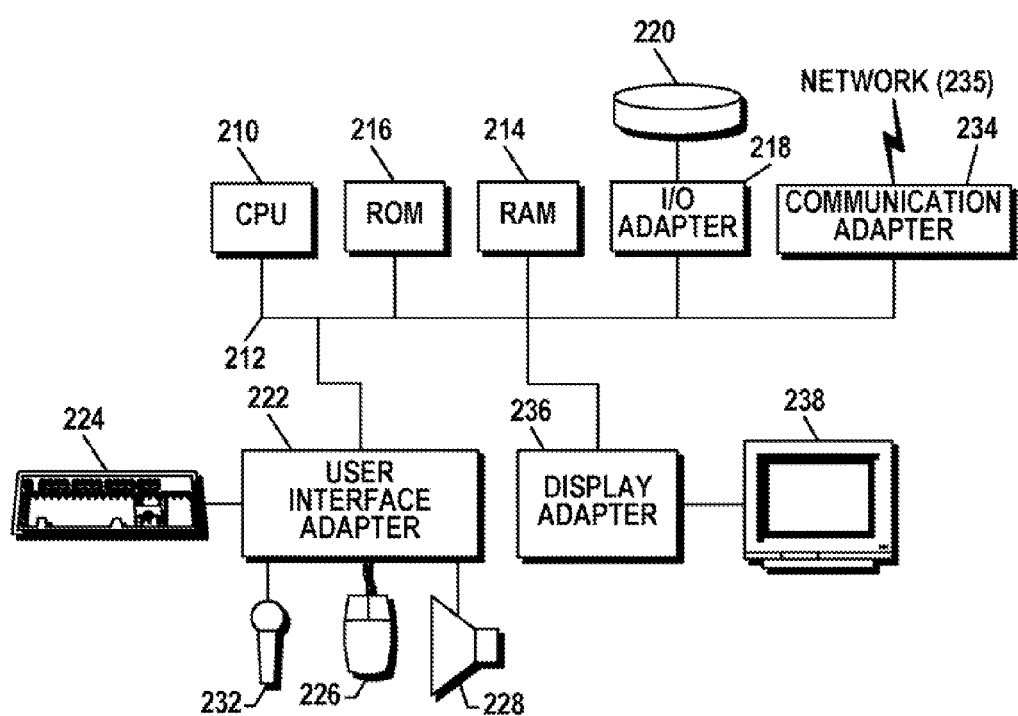
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit (CPU) 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
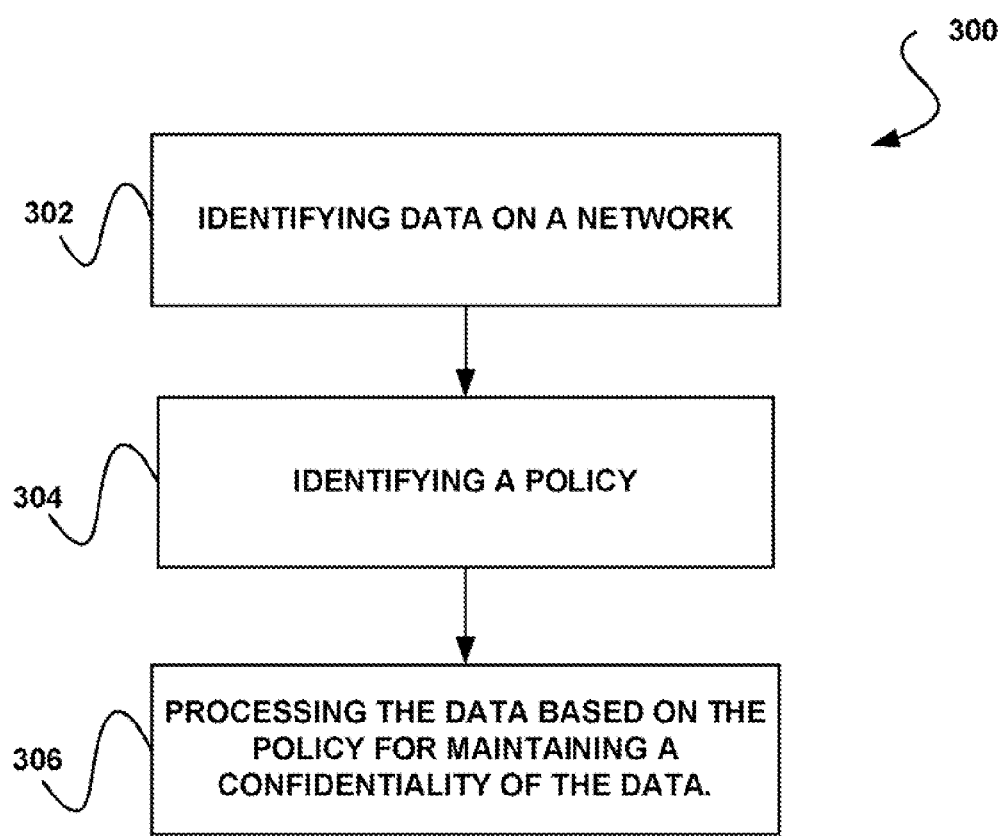
FIG. 3 shows a method for processing data based on a policy for maintaining a confidentiality of the data, in accordance with one embodiment.

FIG. 3 shows a method 300 for processing data based on a policy for maintaining confidentiality of the data, in accordance with one embodiment. As an option, the method 300 may be implemented in the context of the architecture and environment of FIGS. 1 and/or 2. Of course, however, the method 300 may be carried out in any desired environment.

As shown in operation 302, data on a network is identified. In one embodiment, the network may include the Internet. In another embodiment, the network may include an intranet. Of course, however, the network may also include any of the networks described above with respect to FIG. 1 and/or any other network on which data may be identified, for that matter.

In addition, the data may be identified on a device located on the network. In one embodiment, the device may include a server (e.g. mail server, etc.). In another embodiment, the device may include a client. In yet another embodiment, the device may include a security system, such as for example a content manager, an intrusion prevention system (IPS), an intrusion detection system (IDS), a virus scanner, a firewall, etc. It should be noted, however, that the data may be identified on any device located on the network, including, for example, any of the devices described above with respect to FIGS. 1 and/or 2.

Further, in the context of the present description, the data may include network traffic, an electronic mail (e-mail) message, a file, and/or any other data capable of being located on the network. For example, in some embodiments, the data may include computer code, etc. Moreover, in one optional embodiment, the data may possibly include a tag that identifies a confidentiality status of the data. Just by way of example, the tag may identify the data as confidential. Optionally, the tag may identify a level of confidentiality of the data (e.g. high, medium, low, etc.). Further, the tag may identify a scope of the confidentiality (e.g. time limit, users authorized to access the data, etc.).

Still yet, the data may be identified in any desired manner. For example, the data may optionally be identified by scanning data stored on the network. In various embodiments, the data may be identified by scanning a mail server database, a posts database (e.g. a public folders database, etc.), and/or any other data capable of being stored on the network.

As another example, the data may be identified by intercepting data transmitted via the network. Optionally, intercepting the data may include receiving the data at a device, such as, for example, a server (e.g. e-mail server, etc.), a gateway, etc. In various embodiments, the data may be received utilizing simple mail transfer protocol (SMTP), hypertext transfer protocol (HTTP), file transfer protocol (FTP), etc. Of course, any automatic and/or manual identification is contemplated.

In addition, a policy is identified, as shown in operation 304. The policy may include any rule, logic, guideline, standard, and/or information, etc. capable of being utilized to process the data, the reasons for which will be set forth below. In one embodiment, the policy may be generated by a user. Optionally, the policy may only be generated by an authorized user. Of course, the policy may be identified in any desired manner.

In another embodiment, the policy may include at least one rule. For example, such rule may be associated with an attribute and/or property utilized for maintaining a confidentiality of the data. Of course, in some embodiments, it should be noted that a plurality of policies may also be identified.

In various embodiments, the policy may prohibit attachments in data, redirect data originating from a particular source(s), redirect data designated for a particular destination (s), etc. Of course, it should be noted that the policy may include any rule, etc. capable of being applied to the data. In another embodiment, the policy may optionally include an action to take in response to violation of the policy. Such action may include, for example, preventing transmission of the data to an associated destination, providing a notification to a user (e.g. sender, receiver, administrator, etc.), deleting the data, etc.

In yet another embodiment, the policy may be platform-independent. For example, the policy may be utilized by a plurality of different security systems that process the data (e.g. IPS, content manager, firewall, etc.). Moreover, the plurality of different systems may include different versions (e.g. some up-to-date, some older versions, some without any policies, etc.) and/or may be provided by different entities. Thus, the policy may be generated utilizing a first system that processes the data, and may then be retrieved by any number of different systems for use in processing the data.

Just by way of example, in one optional embodiment, the policy may be configured utilizing a security system associated with an e-mail server (e.g. McAfee®GroupShield® for Microsoft® Exchange, etc.). Thereafter, the policy may be retrieved and used by a content manager (e.g. McAfee® Secure Content Management solutions, etc.). Such policy may be retrieved automatically and/or manually.

In this way, different security systems may synchronize policies associated therewith, such that the security systems may be complementary. Optionally, such synchronization may be configurable (e.g. periodically, etc.). Allowing policies to be utilized by a plurality of different security systems may, in one optional embodiment, eliminate the need to configure policies that have the same parameters for each security system. Of course, some embodiments are contemplated with such policy configuration. Moreover, if one security system has up-to-date policies, then another security system that does not have all of such policies may be automatically updated therewith, therefore allowing all security systems to be up-to-date.

Still yet, the policy may be identified in any desired manner. In one embodiment, the policy may be identified based on the data. Optionally, the policy may be identified as being associated with, applicable to, etc. the data. For example, the policy may be associated with a particular confidentiality status.

Thus, in one embodiment, only policies with a confidentiality status that matches a confidentiality status of the data may be identified. An example of such confidentiality status will be described in more detail below. Additionally, the policy may be stored on any device located on the network. For example, the policy may be stored on a device that intercepts the data, a device that transmits the data, a device that stores the data, etc.

Furthermore, as shown in operation 306, the data is processed based on the policy for maintaining a confidentiality of the data. In one embodiment, the data may optionally be compared to the policy for determining whether the data violates the policy. Thus, the data may be processed based on the comparison.

In another embodiment, the data may be processed according to an action defined in the policy. Thus, as described above, the data may be allowed to be transmitted, for example, if the policy is not violated. As another option, the data may be quarantined, deleted, etc. if the policy is violated.

Furthermore, the data may be processed by any desired device. For example, the data may be processed by a client and/or server on which the data is located. As another example, the data may be processed by a device that intercepts the data. As yet another example, the data may be processed by a gateway (e.g. e-mail server, etc.). Optionally, the device on which the data is processed may also store the policy, as described above. Accordingly, server-based data processing and/or client-based data processing may be utilized.

In this way, policies may be utilized for maintaining a confidentiality of data. In particular, policies may be utilized for ensuring confidential data is not compromised, for example, by preventing transmission outside of a predefined subset of devices, by preventing attachments from being transmitted, etc. Thus, internal and external compromise of data may be prevented.

In one optional embodiment, it may be determined whether the data on the network includes a tag indicating a confidentiality status of the e-mail. The confidentiality status may include levels of confidentiality and/or a scope of such confidentiality (e.g. users authorized to receive the data, etc.). Of course, the confidentiality status may also indicate that associated data is not confidential.

If it is determined that the e-mail does not include such a tag, the data may be analyzed for determining whether any portion of the data is confidential (not shown). Such analysis may be based on predefined rules, heuristics, etc. Further, a tag may be generated based on the determination, and may be applied to the data.

Moreover, a user associated with the data and/or an administrator may be notified of such generated tag and the data associated therewith. In this way, data on a network, including, for example, e-mail messages in a mail server, attachments of such e-mail messages, posts in public folders, etc. that do not have a tag indicating a confidentiality status thereof may be provided with such tag. In one embodiment, a scanning system (e.g. on-demand, periodically, as a background task, etc.) may be utilized for identifying data that does not include a tag, for generating a tag accordingly and/or for processing the data based on a policy.

In another optional embodiment, it may be determined whether the data is associated with a predefined availability time period threshold. The determination may be made periodically (e.g. as a background task, etc,), on-demand, etc. In addition, such determination may optionally be based on a confidentiality status of the data.

For example, the data may be associated with such a threshold for indicating that the data is to be made unavailable beyond the threshold time period (e.g. 2 days after transmittal of the e-mail, etc.). Thus, once the threshold has been met, action may be taken to make the data unavailable. In various embodiments, the data may be made unavailable by deleting the data from the mail server and/or local client, preventing the data from being forwarded, preventing the data from being printed, preventing the data from being copied, etc. Accordingly, it may be ensured that confidential data is only available for a predefined period of time, thus limiting the time period in which such confidential data may be compromised.

More illustrative information will now be set forth regarding various optional architectures and features of different embodiments with which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
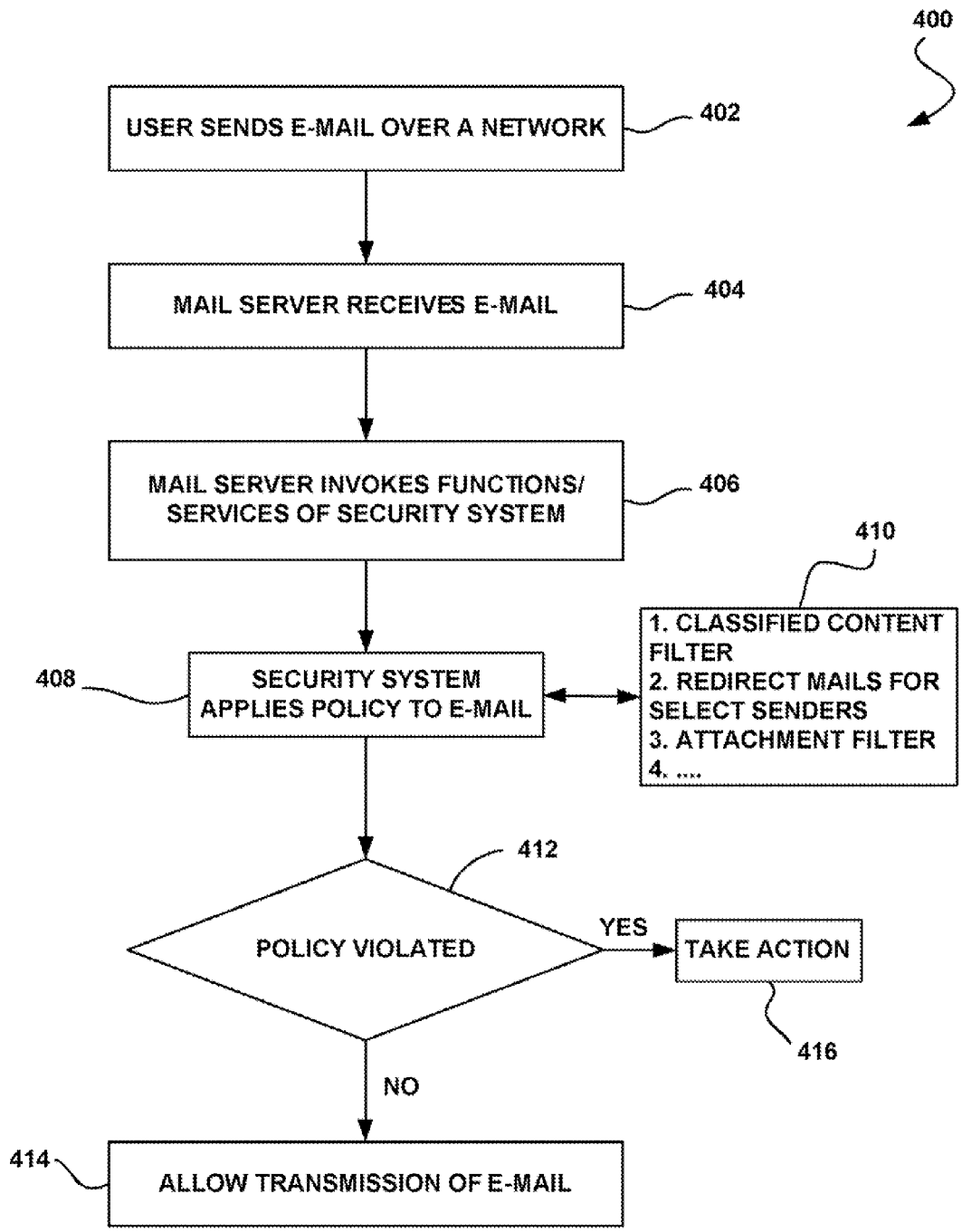
FIG. 4 shows a method for processing an e-mail based on a policy of a security system for maintaining a confidentiality of the e-mail, in accordance with another embodiment.

FIG. 4 shows a method 400 for processing an e-mail based on a policy of a security system for maintaining a confidentiality of the e-mail, in accordance with another embodiment. As an option, the method 400 may be implemented in the context of the architecture and environment of FIGS. 1-3. Of course, however, the method 400 may be carried out in any desired environment. It should also be noted that the aforementioned definitions may apply during the present description.

As shown in operation 402, a user sends an e-mail over a network. The user may send the e-mail by sending, replying, forwarding, etc. the e-mail utilizing any desired e-mail application. For example, the user may send the e-mail utilizing Microsoft® Outlook®, etc. Moreover, the user may send the e-mail utilizing a computer located on the network. Optionally, the user may apply a tag to the e-mail for indicating a confidentiality status of the e-mail (e.g. confidential, not confidential, scope of confidentiality, etc.).

A mail server then receives the e-mail, as shown in operation 404. The mail server may include any computer capable of processing the e-mail. For example, the mail server may include a Microsoft® Exchange server, an IBM® Domino® server, etc. In one embodiment, the mail server may be capable of transmitting the e-mail to a designated destination. In another embodiment, the mail server may also be capable of storing the e-mail for retrieval by a destination computer associated with the e-mail.

Further, the mail server invokes functions/services of a security system, as shown in operation 406. Optionally, the mail server may only invoke such security system if a setting directing the mail server to do so has been set (e.g. by a user, administrator, etc.). In this way, the security system may be utilized as desired.

The security system may include any security application (e.g. McAfee® GroupShield®, etc.), for example. Of course, however, the security system may also include a content manager, firewall, etc. In one embodiment, the security system may be stored on the mail server. Further, the security system may be integrated with an application of the mail server. In another embodiment, the security system may be stored on a computer remote from the mail server. Thus, the mail server may directly or remotely invoke at least a portion of the security system, based on the location of the security system.

Additionally, as shown in operation 408, the security system applies a policy to the e-mail. The policy may be associated with the security system, for example. Of course, it should be noted that the security system may also apply a plurality of policies to the e-mail. As shown in operation 410, the security system may apply the policy to the e-mail by retrieving the policy (e.g. from a database of policies, etc.).

In one embodiment, the security system may only apply a policy to the e-mail that is associated with such e-mail. Just by way of example, a policy utilized for maintaining a confidentiality of data may only be applied to the e-mail if the e-mail includes a tag indicating that the e-mail is confidential. As another example, a policy associated with a particular confidentiality status that matches a confidentiality status of the e-mail may be applied thereto. Of course, however, the policy may also be applicable to all e-mail messages.

For example, the policy may include a classified content filter that controls the transmission of the e-mail. Such classified content filter may indicate that e-mail of a specific confidentiality status is to be filtered, and therefore prevented from being transmitted to an associated destination. As another example, the policy may indicate that the e-mail is not allowed to be directly transmitted to at least one destination in a predetermined list of destinations (e.g. e-mail addresses, etc.). As yet another example, the policy may indicate that the e-mail is not allowed to be transmitted from the sender based on a predetermined list of origins (e.g. e-mail addresses, etc.). Further, the policy may indicate that the e-mail is not allowed to include an attachment. Of course, it should be noted that the policy may include any rule, standard, etc. capable of being applied to the e-mail.

Optionally, predetermined e-mail messages may be exempt from having the policy applied thereto. For example, a list may identify sources of e-mail messages, recipients of e-mail messages, etc. for which the policy is not to be applied. In this way, e-mail messages may be allowed to be transmitted without any policies being applied thereto (not shown).

As shown, it is determined in decision 412 whether the e-mail violates the policy. Thus, in the context of one embodiment, it may be determined whether the e-mail designates a source and/or destination included in a predetermined list of sources and/or destinations from which the e-mail may not originate and/or to which the e-mail may not be directly sent, for example. In the context of another exemplary embodiment, it may be determined whether the e-mail includes an attachment.

If it is determined that the e-mail does not violate the policy, then transmission of the e-mail may be continued. Note operation 414. Accordingly, the e-mail may be allowed to be transmitted to an associated destination address. If, however, it is determined that the e-mail does violate the policy, then an action may be taken, as shown in operation 416. The action may optionally be designated by the policy. As another option, the action may be taken by the security system.

The action may include, for example, redirecting the e-mail to a predetermined address if the e-mail is not to be directly transmitted to its designated destination and/or if the e-mail originates from a source within a predetermined list of sources, as described above. In this way, the e-mail may optionally be screened prior to being delivered to a destination that may be suspect. The action may also include removing an attachment from the e-mail if the e-mail is not allowed to include an attachment, and only allowing transmittal of the e-mail after removal of such attachment. Optionally, the attachment may be posted to a document portal (e.g. Microsoft® SharePoint, etc.) upon removal thereof.

Of course, in other various embodiments, the action may include rejecting transfer of the e-mail, sending a notification to the user that sent the c-mail, sending a notification to an administrator about the e-mail, quarantining the e-mail for further analysis, logging information associated with the e-mail, and/or any other action capable of being taken with respect to the e-mail. Thus, it may be ensured that confidential e-mails remain confidential based on policies.

Figure 5:
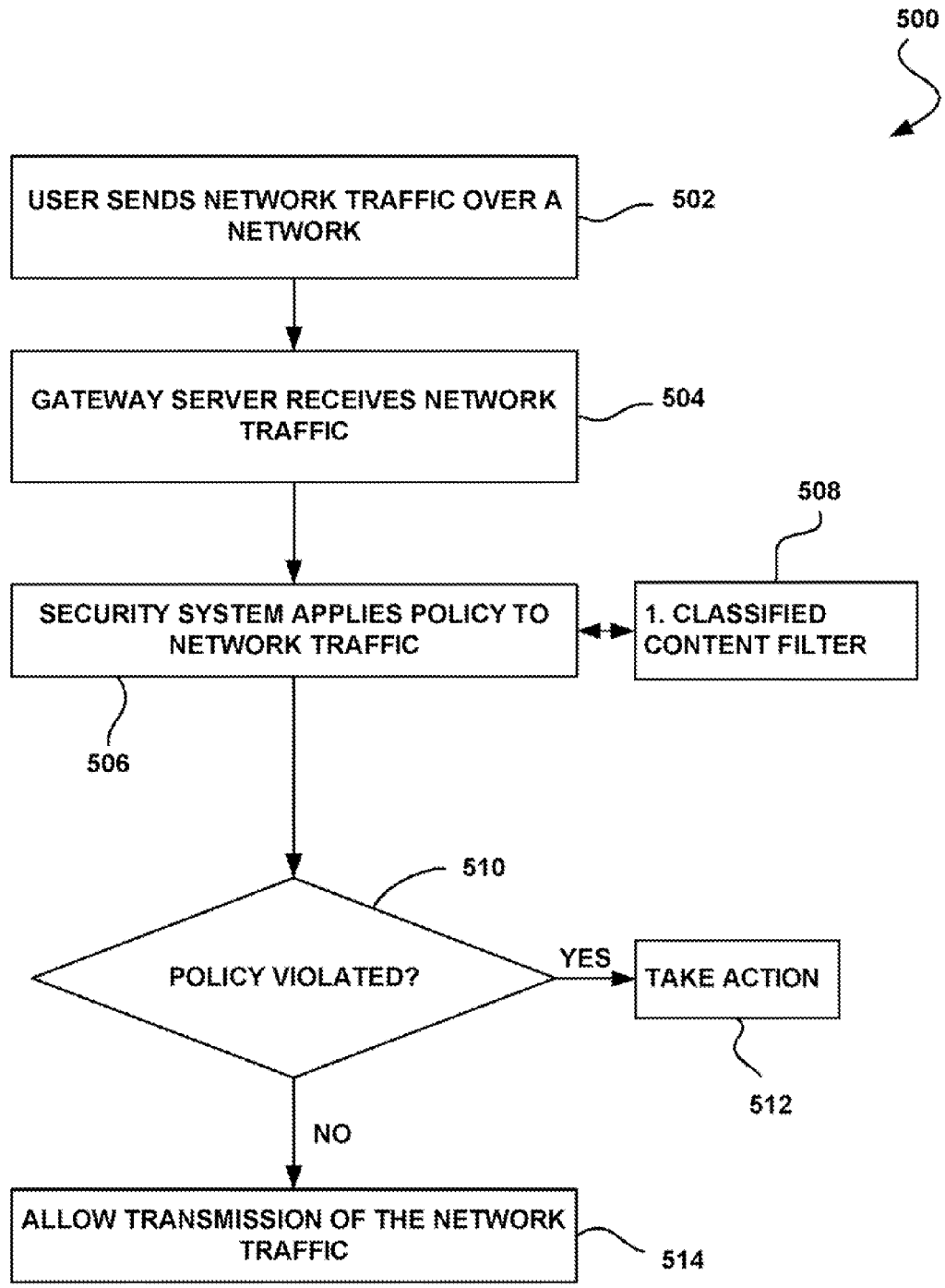
FIG. 5 shows a method for processing network traffic based on a policy of a security system for maintaining a confidentiality of the network traffic, in accordance with yet another embodiment.

FIG. 5 shows a method 500 for processing network traffic based on a policy of a security system for maintaining a confidentiality of the network traffic, in accordance with yet another embodiment. As an option, the method 500 may be implemented in the context of the architecture and environment of FIGS. 1-5. Of course, however, the method 500 may be carried out in any desired environment. It should also be noted that the aforementioned definitions may apply during the present description.

As shown in operation 502, a user sends network traffic over a network. The network traffic may include any data (e.g. packets, etc.) capable of being transmitted over a network. The network traffic may also include SMTP, HTTP, FTP, etc.

Just by way of example, the network traffic may include a request made from one computer to another computer. The network traffic may also include a web based e-mail. Still yet, the network traffic may relate to the downloading of a web site.

In addition, a gateway server receives the network traffic, as shown in operation 504. The gateway server may include any computer capable of receiving the network traffic. In one embodiment, the gateway server may include a server that connects a plurality of different networks. Thus, the gateway server may be utilized for transmitting network traffic between such different networks. In the context of the present embodiment, the gateway server may receive the network traffic sent by the user for transmitting such network traffic to another computer located on a different network.

Further, as shown in operation 506, a security system applies a policy to the network traffic. The security system may include a content manager, such as for example the McAfee® Secure Content Manager, but of course may also include any system capable of providing security (e.g. IPS, firewall, etc.). In addition, the security system may optionally be located on the gateway server. In this way, the gateway server may be utilized for applying a security policy to the network traffic.

As shown, the policy may include a classified content filter (note operation 508). For example, such classified content filter may specify rules that network data must comply with. In one embodiment, the classified content filter may specify rules for network data that includes a tag indicating a confidential status. In this way, the policy may only be applicable to confidential network traffic.

For example, such policy may include prohibiting direct communication with predetermined network addresses [e.g. interne protocol (IP) addresses, etc.]. Of course, it should be noted that the policy may include any type of data capable of controlling the transmission of network traffic. In addition, the policy may include an action to take in response to the violation of and/or compliance with the policy by the network traffic. Such action will be described in more detail below.

As an option, predetermined network traffic may be exempt from having policies applied thereto. As described above with respect to FIG. 4, a list may identify sources of network traffic, recipients of network traffic, etc. for which the policies are not to be applied. In this way, network traffic may be allowed to be transmitted without any policies being applied thereto (not shown).

It is then determined whether the network traffic has violated the policy, as shown in operation 510. Such determination may be based on whether the network traffic violates a rule of the policy. In the context of a policy that prohibits direct communication with predetermined network addresses, the network traffic may violate the policy if the network traffic is destined for one of such predetermined network addresses.

If it is determined that the network traffic does not violate the policy, transmission of the network traffic to an associated destination address is allowed. Note operation 514. If, however, it is determined that the network traffic does violate the policy, then an action is taken. The type of action may be based on the specific policy violated, for example, where the policy specifies the action to be taken.

As described above with respect to FIG. 4, the action may include rejecting transfer of the network traffic, sending a notification to the user that sent the network traffic, sending a notification to an administrator about the network traffic, quarantining the network traffic for further analysis, logging information associated with the network traffic, and/or any other action capable of being taken with respect to the network traffic. Thus, such actions may be utilized for ensuring that confidential e-mails remain confidential based on policies. Thus, the policy may be utilized for maintaining a confidential status of network traffic.

Thus, in one exemplary embodiment, data may be classified as confidential automatically (e.g. by a security system, etc.), by being marked by a user (e.g. author of the data, administrator, etc.) and/or in any other desired manner. Optionally, the data may only be classified by security systems, users, etc. that are authorized to do so. The confidential status of the data may then be identified and utilized by a security system for processing the data. Further, data that does not include a confidentiality status may be marked with such a status by a security system.

In another exemplary embodiment, if there are multiple security systems that are in use by an organization, a policy set by one of the security systems may be retrievable and reusable by the other security systems. Just by way of example, if GroupShield® for Microsoft® Exchange sets a policy to be applied to confidential data, then a Secure Content Manager may retrieve it and use it based on a configuration of the security systems, and vice versa. This may ensure that all security systems work in tandem and complement each other. In addition, time may be saved as well. Moreover, if GroupShield® for Microsoft® Exchange has the latest data leakage prevention policies and a Secure Content Manager has an older set of policies and/or no policies, then the Secure Content Manager may receive a benefit simply by retrieving and using the policy set by GroupShield® for Microsoft® Exchange.

In still yet another embodiment, confidentiality of e-mails and posts that are already in the e-mail database and posts database (e.g. public folders, etc.) may be maintained. Thus, confidentiality may be maintained when an e-mail is being sent/replied/forwarded and for the e-mails/posts that are already in the e-mail database on a, e-mail server. For example, a security system may traverse through the entire e-mail/posts database(s) proactively (e.g. utilizing background scanning in GroupShield® for Microsoft® Exchange etc.) and tag those e-mails/attachments/posts, thus saving time and allowing the users and/or administrators to be alerted beforehand that they are storing confidential e-mails/attachments/posts in their e-mail/posts database(s).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method to be performed in conjunction with a processor operating in an electronic environment, comprising:
    identifying data on a network;
    identifying a policy having an associated confidentiality status;
    wherein the policy is platform-independent;
    processing the data based on the policy for maintaining a confidentiality of the data; wherein processing the data includes:
    determining whether the data includes a tag identifying a confidentiality status of the data and a time limit of the confidentiality of the data beyond which the data is to be made unavailable;
    processing the data according to the policy if it is determined that the data includes the tag and the confidentiality status of the data identified by the tag matches the confidentiality status associated with the policy; and
    wherein if it is determined that the data does not include the tag, generating the tag for the data.

2. The method as recited in claim 1, wherein the data includes network traffic.

3. The method as recited in claim 1, wherein the data includes electronic mail.

4. The method as recited in claim 1, wherein the data is included in a database including one or more of a mail server database and a pubic folder database.

5. The method as recited in claim 1, wherein the data is received at a server.

6. The method as recited in claim 5, wherein the data is received utilizing a protocol including one of simple mail transfer protocol, hypertext transfer protocol, and file transfer protocol.

7. The method as recited in claim 5, wherein the server identifies the policy utilizing a security system.

8. The method as recited in claim 7, wherein the security system processes the data based on the policy for maintaining the confidentiality of the data.

9. The method as recited in claim 1, wherein the data is processed according to a determination of whether the policy is violated in association with the data.

10. The method as recited in claim 1, wherein processing the data includes removing the data from a storage location in which the data is stored.

11. The method as recited in claim 10, wherein the policy includes a threshold period of time, and the data is removed from the storage location after the threshold period of time.

12. The method as recited in claim 1, wherein processing the data includes redirecting the data from a first destination address to a second destination address.

13. The method as recited in claim 1, wherein processing the data includes removing an attachment associated with the data.

14. The method as recited in claim 1, wherein processing the data includes allowing the data to be transmitted to a source address.

15. The method as recited in claim 1, wherein the policy is utilized by a plurality of different security systems.

16. A computer program product embodied on a non-transitory tangible computer readable medium for performing operations, comprising:
    identifying data on a network;
    identifying a policy having an associated confidentiality status;
    wherein the policy is platform-independent;
    processing the data based on the policy for maintaining a confidentiality of the data; wherein processing the data includes:
    determining whether the data includes a tag identifying a confidentiality status of the data and a time limit of the confidentiality of the data beyond which the data is to be made unavailable;
    processing the data according to the policy if it is determined that the data includes the tag and the confidentiality status of the data identified by the tag matches the confidentiality status associated with the policy; and
    wherein if it is determined that the data does not include the tag, generating the tag for the data.

17. A system, comprising:
    a hardware processor for identifying data on a network, the processor further adapted for processing the data based on the policy for maintaining a confidentiality of the data, wherein the policy has an associated confidentiality status;
    wherein the policy is platform-independent;
    wherein the system is operable such that processing the data includes determining whether the data includes a tag identifying a confidentiality status of the data and a time limit of the confidentiality of the data beyond which the data is to be made unavailable;
    processing the data according to the policy if it is determined that the data includes the tag and the confidentiality status of the data identified by the tag matches the confidentiality status associated with the policy; and
    wherein if it is determined that the data does not include the tag, generating the tag for the data.

18. The system as recited in claim 17, further comprising memory coupled to the processor via a bus.

19. The method as recited in claim 1, wherein the tag identifies a scope of the confidentiality.

20. The method as recited in claim 1, wherein the tag identifies one or more users authorized to access the data.

21. The method as recited in claim 1, wherein the tag is applied to the data.

22. The method as recited in claim 1, wherein the tag is separate from the data.

23. The method as recited in claim 1, wherein the policy includes at least one rule, the rule associated with an attribute utilized for maintaining a confidentiality of the data.

24. The method of claim 1, wherein processing the data further includes determining whether a portion of the data is confidential if it is determined that the data does not include the tag.

* * * * *